May 7, 1957 L. C. SNYDER 2,791,162
PHOTOGRAPHIC PRINTING APPARATUS
Filed Dec. 1, 1955 6 Sheets-Sheet 1

LEW C. SNYDER
*INVENTOR.*

BY
*Smith & Tuck*

May 7, 1957  L. C. SNYDER  2,791,162
PHOTOGRAPHIC PRINTING APPARATUS
Filed Dec. 1, 1955  6 Sheets—Sheet 2

FIG.__2

LEW  C.  SNYDER
*INVENTOR.*

BY Smith & Tuck

May 7, 1957 — L. C. SNYDER — 2,791,162
PHOTOGRAPHIC PRINTING APPARATUS
Filed Dec. 1, 1955 — 6 Sheets-Sheet 3

LEW C. SNYDER
*INVENTOR.*

BY
*Smith + Tuck*

May 7, 1957  L. C. SNYDER  2,791,162
PHOTOGRAPHIC PRINTING APPARATUS
Filed Dec. 1, 1955  6 Sheets-Sheet 4
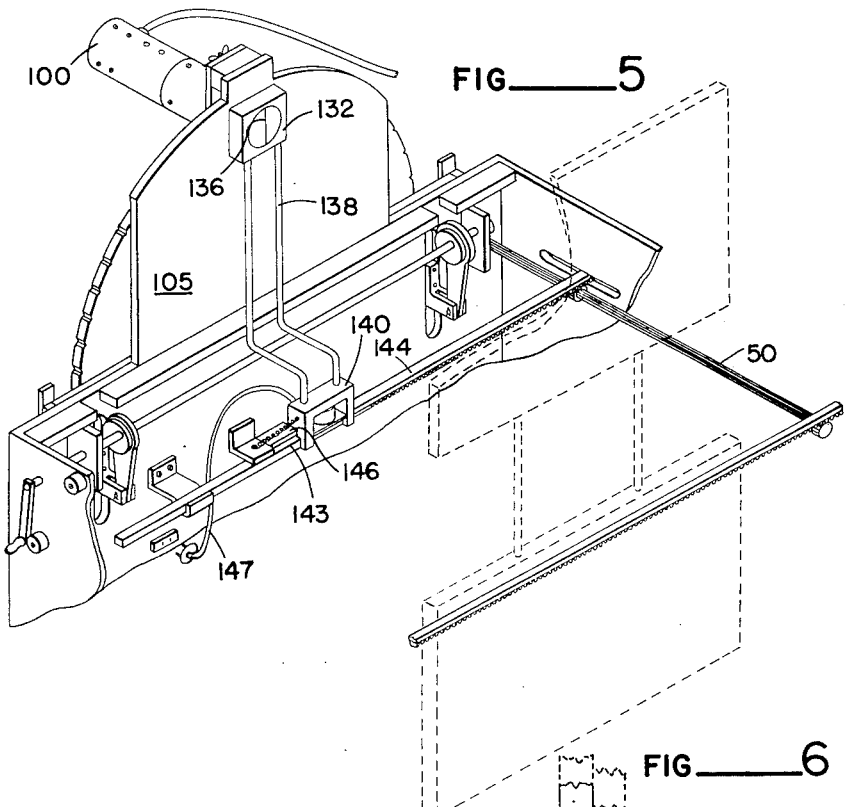
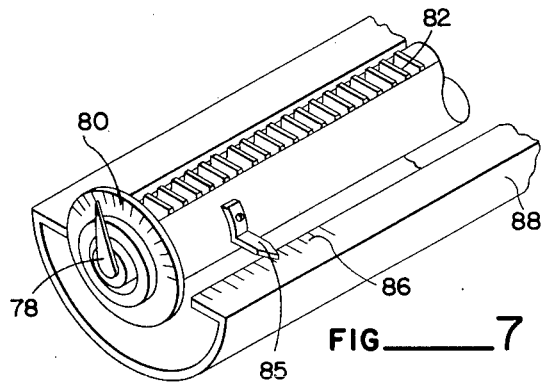
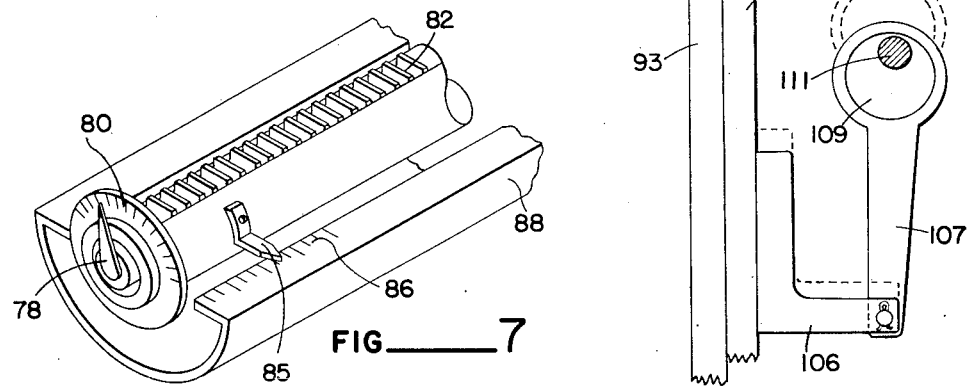
LEW C. SNYDER
*INVENTOR.*
BY Smith & Tuck May 7, 1957 L. C. SNYDER 2,791,162
PHOTOGRAPHIC PRINTING APPARATUS
Filed Dec. 1, 1955 6 Sheets-Sheet 5
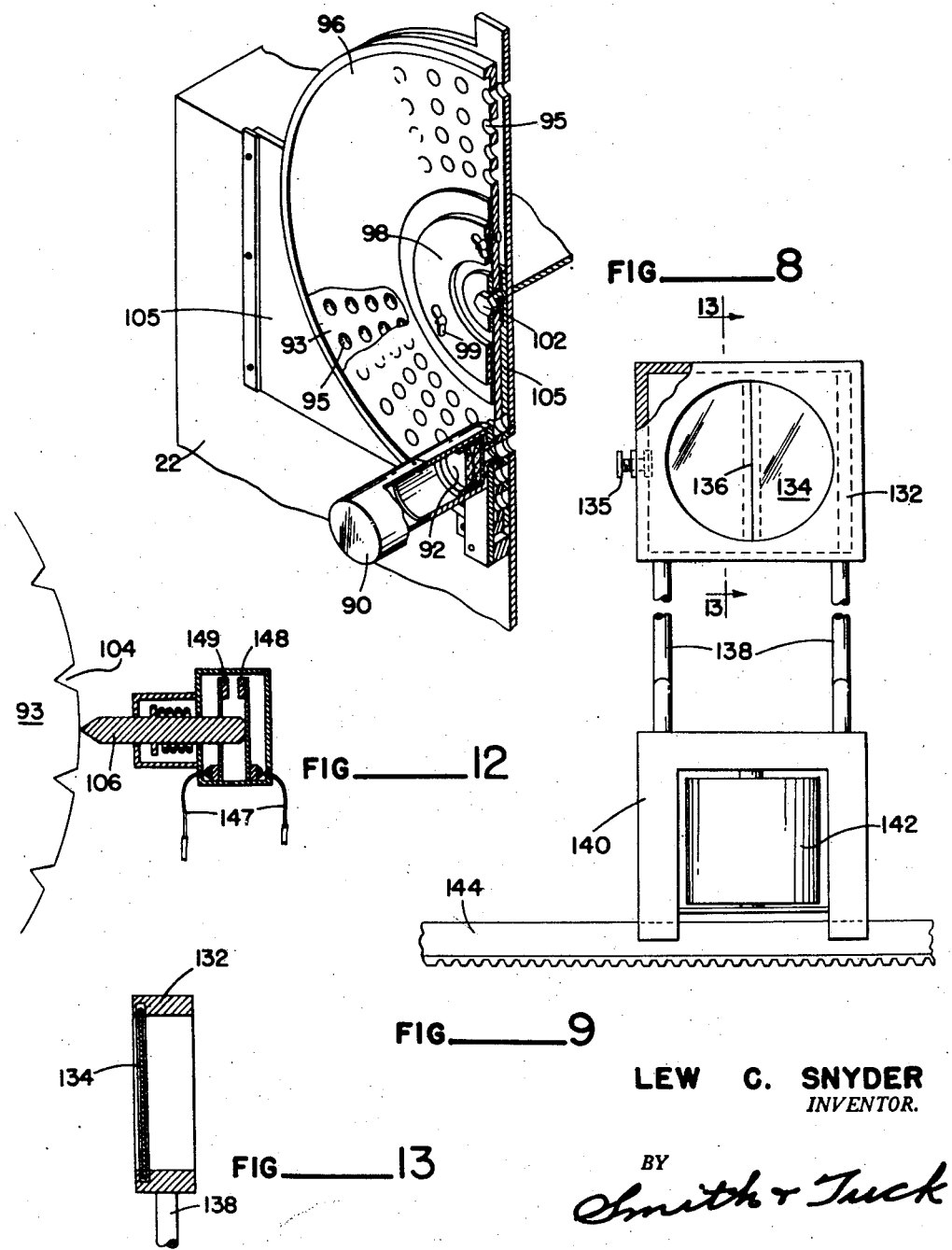
LEW C. SNYDER
*INVENTOR.*
BY
Smith & Tuck May 7, 1957  L. C. SNYDER  2,791,162
PHOTOGRAPHIC PRINTING APPARATUS
Filed Dec. 1, 1955  6 Sheets-Sheet 6

LEW C. SNYDER
*INVENTOR.*

BY
*Smith & Tuck*

United States Patent Office 2,791,162
Patented May 7, 1957

---

2,791,162
PHOTOGRAPHIC PRINTING APPARATUS

Lew C. Snyder, Seattle, Wash.

Application December 1, 1955, Serial No. 550,376

7 Claims. (Cl. 95—4.5)

This invention relates generally to the art of photographic preparation of plates for printing purposes and more particularly to an apparatus in which the type or characters are carried on a revolvable platen, which is perforated or cut away under the letter which is imposed on a translucent or preferably transparent film. Light is projected through the letter carrying film and a photographic image is then formed on a sensitized surface within the apparatus which adequately guards against all other sources of light. Means are provided outside of the cabinet involving a projector very similar to that used to project the letter and which projects the image of the same letter, projected on the sensitized surface, but projects it through suitable lenses upon a screen outside of the cabinet to the end that the operator can accurately compose the subject matter for which the plate is being prepared. This permits proper justification of the printing subject matter.

This present application is a continuation-in-part of my United States patent application, Serial No. 304,801, filed August 16, 1952, now Patent No. 2,725,802, of December 6, 1955. This present application makes use of many of the features of the former application noted and in addition provides for greater ease and precision in the operation of the mechanism of the cabinet. The exterior composing panel is provided with additional means so that the exact positioning of the letter can be achieved and corrections or variations made in the positioning to the end that the spacing between the letters may be increased or decreased at will and thus make it possible to achieve composition effects that overcomes many deficiencies of the conventional composition made up of set type and to thereby take fullest advantage of the flexibility of the photographic composition apparatus forming the subject matter of this present application.

In this present modification of my former application I have provided improved means and certain additional features which make it relatively easy for persons of limited skill or experience to make up printing plates wherein the basic cost is but a fraction of that involved in a print shop employing the many fonts of type required for such an establishment. Further, this equipment makes it possible for the operator to achieve effects and niceties of composition that cannot physically be achieved by the older methods of type setting using individual type.

The principal object of this present invention therefore is to provide an improved photographic apparatus for the accurate composing of printed materials.

A further object of this invention is to employ a single alphabetical disc having two alphabets with the characters duplicated on diameters to the end that one projection device will project a character or letter into the light tight cabinet and the other projection device will project the same letter or character onto the open screen disposed outside of the cabinet but connected to the inner sensitized screen to the end that the operator can determine, from viewing the outside screen, where his character will fall on the sensitized but enclosed screen.

A further object of this present apparatus is to provide a light tight cabinet which has housed within it or attached to it all of the essential elements necessary for the creation of an exposed sensitized composition sheet, the precise composition of which has been indicated to the operator by a projection screen outside the light tight cabinet.

A further object of this invention is to provide a photographic apparatus which makes it possible for the operator to make changes in positioning of a letter so as to balance the composition or justify the printing with the assurance which seeing it projected upon a screen can give to the operator because he has a group of reference lines or characters projected with his letter upon the screen and that accurate adjustment or re-arrangement can be effected.

Further objects, advantages and capabilities will be apparent from the description and disclosure in the drawings, or may be comprehended or are inherent in the device.

In the drawings:

Figure 5 is a fragmentary perspective view showing certain of the parts as though the cover were removed from the cabinet and with the position of certain other parts indicated by dashed lines;

Figure 6 illustrates the mechanism employed for shifting the alphabetical platen or disc so as to engage normally upper or lower case letters or characters;

Figure 7 illustrates an indicating means employed to derive intelligence from the positioning of a gear rack which rack serves to position the lens board of the projection lens;

Figure 8 is a perspective view, partly in section, illustrating the construction of the alphabet carrying platen and the associated projection light and other components;

Figure 9 illustrates an index means part of which is enclosed within the light proof cabinet and the upper part of which is outside of the cabinet;

Figure 12 illustrates an electrical switching means which is operated by the notched periphery of one of the discs making up the alphabet projection platen;

Figure 13 is a vertical section view taken along the line 13—13 of Figure 9.

Figure 1:
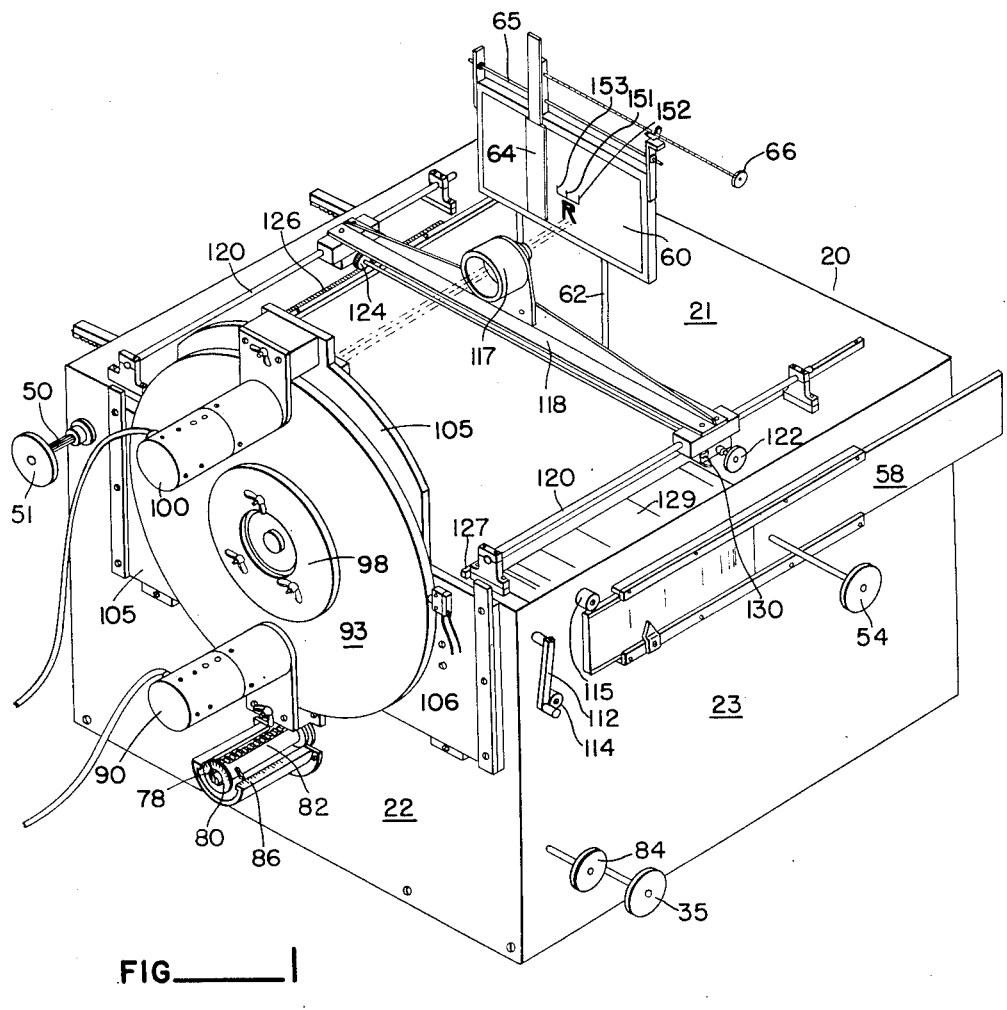
Figure 1 is a perspective view illustrating a preferred embodiment of my present invention.

Referring more particularly to the disclosure in the drawings, the numeral 20 designates my light proof cabinet generally. This enclosing cabinet 20 is arranged to provide against the entry of light to the interior. As there are many controls out from the interior of the box, gland type bearings should be employed on the various shafts and sliding closure members on those instances where operational connections are made between interior and exterior units which move in unison. Such closures are shown in some detail by my former application and are quite generally understood by persons skilled in this form of equipment. For the convenience of the operator the controls for the units have been limited to the top 21, the front wall or panel 22, and the one side 23, to the end that a person generally stationed near the corner joining surfaces 22 and 23 can, from this position, conveniently reach all of the various controls required for the functioning of the apparatus. This relationship will probably be best understood by a study of Figure 1.

Figure 2:
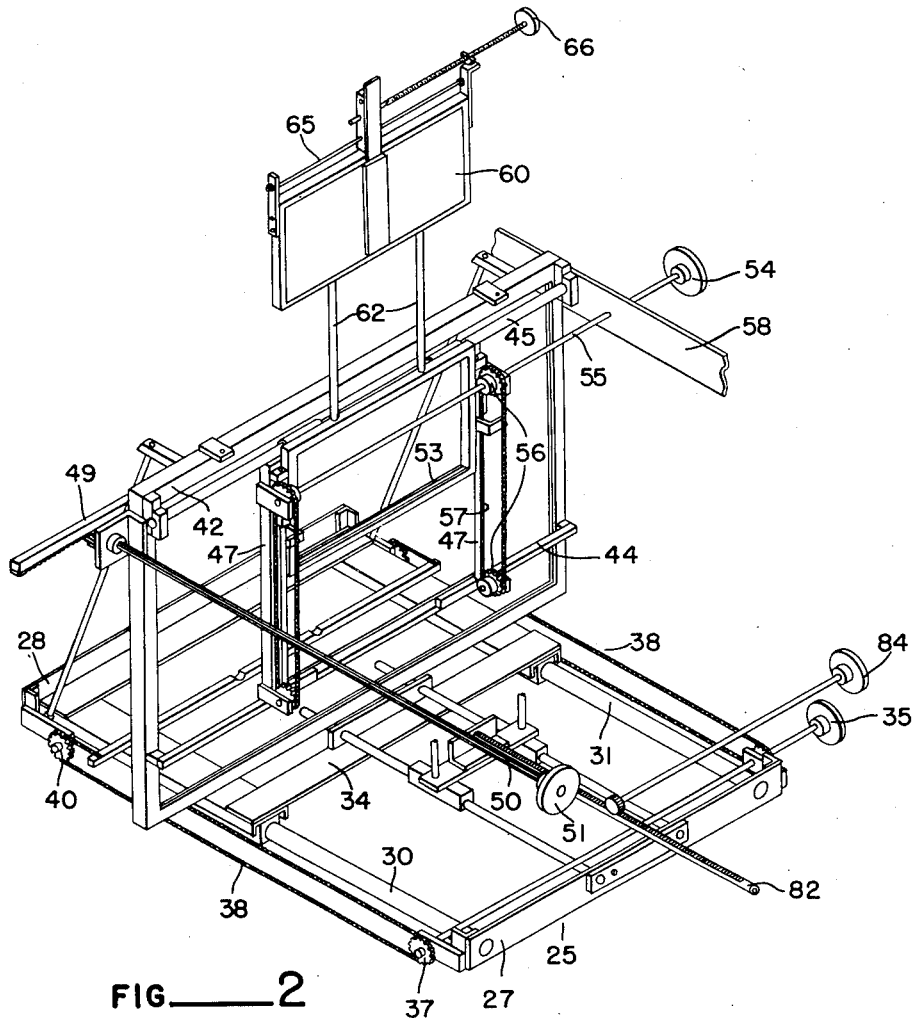
Figure 2 is a perspective view illustrating part of the interior mechanism of my apparatus and especially illustrating the holder for the sensitized screen and the viewing screen which is adapted to viewing from outside of the enclosed cabinet.
Figure 3:
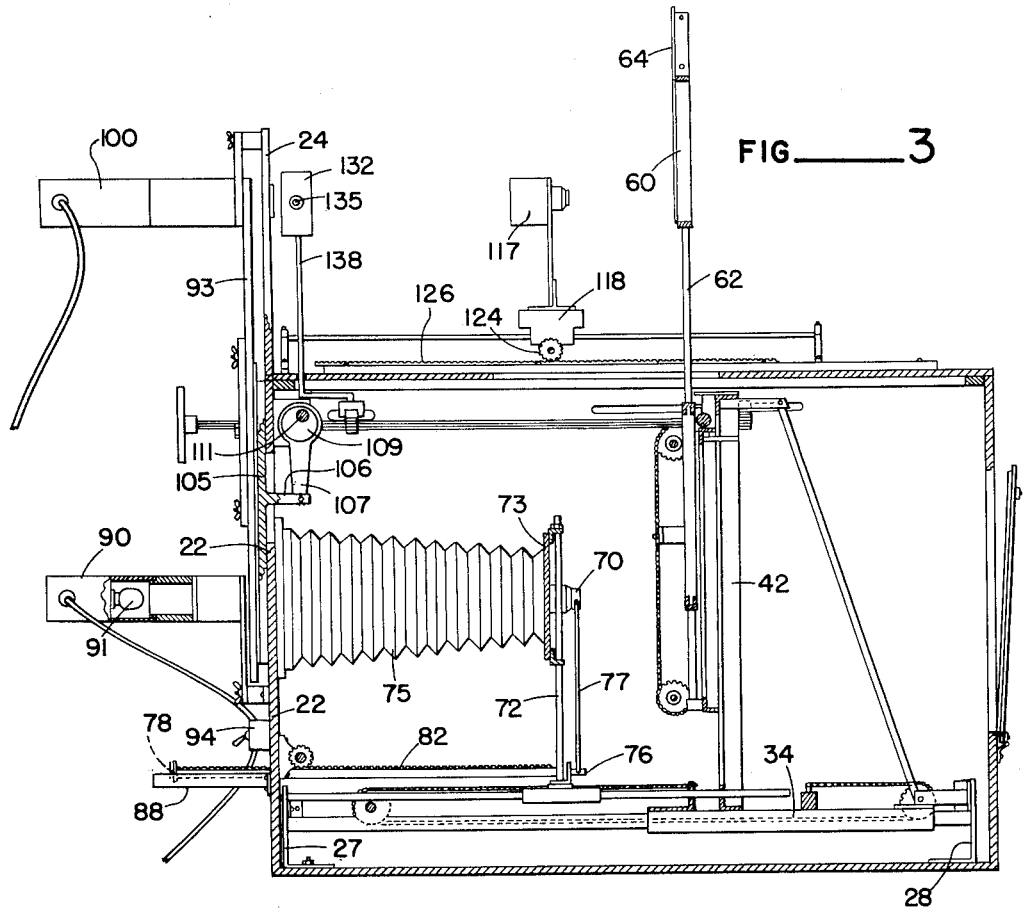
Figure 3 is a vertical sectional view taken longitudinally through the apparatus of Figure 1 substantially along the plane of line 3—3 of Figure 1.
Figure 4:
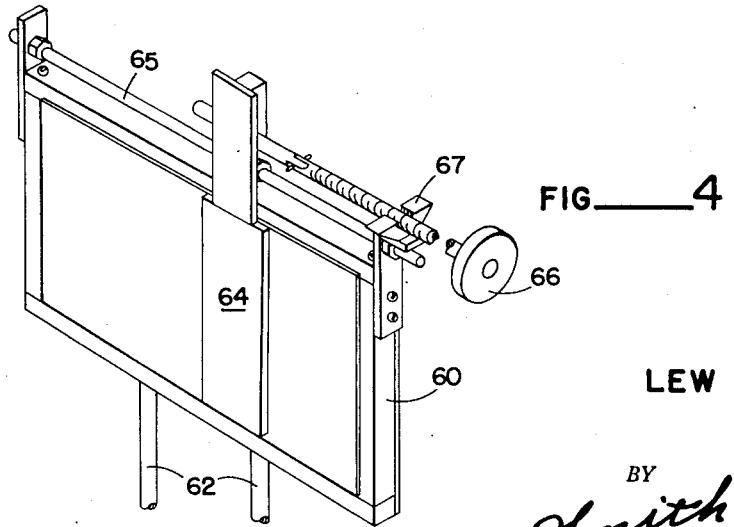
Figure 4 is a perspective view illustrating the holder or framework carrying the outside viewing target or screen.
Figure 10:
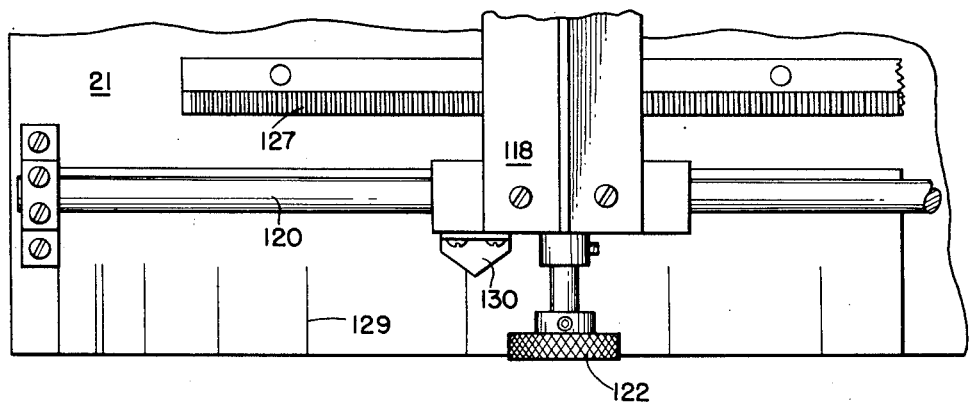
Figure 10 is a fragmentary top plan view of one end of the secondary index or framing device carrier showing the manner in which the arrangement is provided with its own indicator and graduated reference scale.
Figure 11:
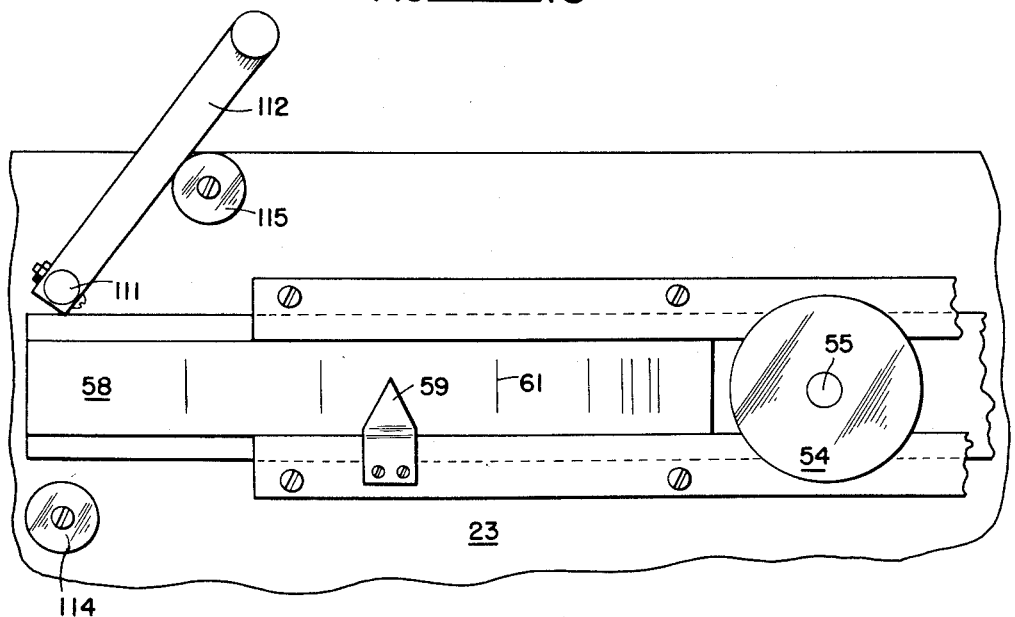
Figure 11 is a face view of a portion of the side shown in Figure 1 of the light proof housing, and illustrating certain relationship of the parts and showing them in a different position than illustrated in Figure 1.

Referring to Figures 2 and 3, the main interior functional moving parts of the device are shown. A horizontally disposed framework 25 forms in effect, the chassis to which the other functional parts are secured. This chassis consists of the end members, as 27 and 28, which are fixedly secured to the bottom of cabinet 20. Between these end members are disposed, preferably, two rods or tubes 30 and 31. Adapted to slide on rods 30 and 31 is the main movable carriage 34. In order that the carriage may be positioned from outside of the cabinet a hand wheel 35 is provided, secured to a shaft which is journaled in brackets secured to the end member 27. This shaft carries two sprockets, as 37, which through chains 38 pass around idler sprockets 40 secured to end frame member 28. The free ends of chains 38 are secured to carriage 34 so that manipulation of wheel 35 from outside of the cabinet will adjustably position carriage 34 at the will of the operator along the extent of guides 30 and 31.

Frame 34 is provided with a vertical fixed frame 42. Frame 42, is a true frame in that it has two horizontal members and two vertical members all fixedly joined together. Secured to frame 42 is a lower film guide 44 and an upper film guide 45. Supported from and guided by guides 44 and 45 is the film positioning adjusting frame 47. Frame 47 is adjustable transversely of cabinet 20 by means of rack 49 and the gear shaft 50. Gear shaft 50 is, in effect, an elongated pinion or it may be considered as a shaft having gear teeth cut throughout its length. This arrangement permits driving rack 49 to accomplish transverse movement of frame 47 without regard to the longitudinal position of frame 34 and its associated frame 42 with respect to the cabinet or guides 30 and 31. Gear shaft 50 is provided with a handwheel 51 which for the operator's convenience is positioned outside of cabinet 20. A special frame 53 is provided in order to accept the holders for the sensitized film. This frame, 53, is disposed for vertical movement within frame 47. This movement is achieved by turning the external handwheel 54, its associated shaft 55, and sprockets 56, and chains 57. Shaft 55 passes through the slot cover or light baffle 58 so that the handwheel 54 may be operated from outside the cabinet in various longitudinal positions and still not admit light into the interior of cabinet 20. Index 59 and scale 61 on slide 58 gives an indication of the position of frame 53.

Fixedly secured to frame 53 is the exterior viewing frame 60. This frame is fixedly connected to frame 53 as by the two vertical pillars 62. It will be apparent, it is believed, that with this arrangement any movement of frames 53 occasioned by the operation of handwheel 54, handwheel 51 or handwheel 35 will all be communicated to frame 60, to the end that frame 60 will indicate, at all times, the relative position of the sensitized film in frame 53. Frame 60 is provided with a margin indicating slider 64, which is supported and guided by the horizontal rod 65 and which is under control of handwheel 66 through a suitable shaft. In this arrangement handwheel 66 is raised and the slider moved directly to its approximate position. The threaded and pivotal shaft carrying wheel 66 is then lowered to engage the threaded half bearing 67 and a vernier adjustment may be made. This slider is set, normally, in accordance with the length of the line being composed and gives a definite margin indicator.

Frame 53, which supports the sensitized film, upon which the photographic impressions are successively impressed, is capable of vertical and transverse movement which is centered substantially upon the optical axis of the photographic lens 70. Lens 70 is vertically positioned and supported by a plurality of support members 72. The lens board 73 upon which lens 70 is mounted is connected by a typical camera bellows 75 to the inside of the front panel 22 as in a conventional camera. The iris diaphragm of lens 70 is controlled by turning rod 76 which is connected to the lens by rod 77 and is provided with an indicator 78 so that the setting of the iris diaphragm is indicated on the graduated scale 80, disposed exteriorly of cabinet 20. Lens 70 its support and associated parts are capable of movement longitudinally of the optical axis of the lens by means of rack gear 82, which is operated from the outside of camera 22 by handwheel 84. In order to have a visual indication of the focus of lens 70, rack 82 and the bar from which it is formed, or to which it might be secured, extends out through panel 22 and thus provides for the position indicator 85 with a suitable graduated scale 86 on the fixed member 80.

A lens and light housing is provided at 90 which carries the light 91 and a suitable lens system 92 so that light may be projected through the alphabetical platen disc assembly 93, through lens 70, and thus make an exposure on the sensitized film carried in frame 53. Switch 94 may be used to time the exposure. The disc 93 is preferably perforated with concentric rings of light openings so that a wide variety of letters and characters or symbols may be employed in the final composition. Likewise, upper and lower case letters, special capitals, and the like, can easily be provided. Overlaying disc 93 is preferably a transparent character-bearing overlay 96. These will have arranged upon them a plurality of letters, figures and symbols all generally of a definite type or style. Overlay 96 is preferably made of translucent or transparent material. The overlay 96 is normally opaque except for the letters, figures or symbols which are preferably transparent to the end that light will be freely passed through them so as to form an image on the sensitized disc held in frame 53. Overlay 96 is preferably clamped onto disc 93 as by the centrally disposed pressure plate 98, which is held in place by easily disengaged means as the wing nut 99. The duplicate figures, numbers or symbols used in registry with light source 100 are preferably opaque on a transparent or translucent background.

Disc assembly 93 in order to make the various letters, figures or symbols around the concentric circles for registry with the light source 90 and the indicating light source 100, must be capable of revolution about its center, as 102. In this connection it is to be noted that the various rows of holes or letters, and the like, 95, are radially disposed from center 102 so as to admit of an indexing arrangement. One such indicating arrangement is shown in Figure 12 in which the periphery of disc 93 is provided with a number of slots or indentations, as 104. Adapted to engage these depressions is a spring urged piston or latch member 106. As viewed in Figure 12, latch member 106 has a further function of operating an electrical switching means, to be described later.

In addition to the rotary movement required of disc 93, it is also necessary that it be capable of being moved radially in order that the desired concentric circle of openings or letters, 95, may be brought into registry with the light source. In the present showing this radial movement is in the vertical sense. Pivot pin 102 is secured into a vertically movable crosshead member 105. Member 105 has secured to it a boss, as 106, which extends into the cabinet. Here it is pivotally engaged by a concentric strap 107. Strap 107 operatively encircles eccentric 109, which eccentric in turn is secured and caused to revolve by shaft 111. Shaft 111 extends through panel 23 of cabinet 20 where it is engaged by an operating handle 112. As a convenience to the operator, stops are provided at each end of the movement, as at 114 and 115, which would indicate the position of eccentric for the extreme range of holes 95 with intermediate positions being necessary for engagement with the intermediate concentric rings of openings or letter positions, 95.

It is to be noted that overlay 96 and disc 93 move together in their vertically adjusted positions. Light sources 90 and 100 are fixed in position. Light source 90 being secured fixedly to front panel 22 and the upper light source 100 being fixed to an upward extension 24 of the front panel 22. Several units are used with light source 100 in association with target screen 60, one of these units is the lens assembly 117. Lens 117 is disposed in a common longitudinal vertical plane with lens 70 and this is assured by the fixed construction of the carrier 118 and the two guide members 120. Inasmuch as lens 70 is adjusted toward or away from the sensitized film carried in frame 53, it therefore follows that lens 117 must also be adjusted to a similar distance from viewing screen 60 in order that the two reproductions be the same and the exterior one projected by 117 be a true representation of the images impressed upon the sensitized film.

Movement of carriage 118 is provided for by handwheel 122, which drives a pair of pinions 124 which, in turn, engage gear racks at 126 and 127. A graduated scale is provided on surface 21 at 129 and this is engaged by index 130 secured to carrier 118. This arrangement will give a positioning sensing which can be easily made to conform to that shown on scale 86, which indicates the position of lens 70. It has not been found necessary to tie these two controls together as it will involve complications and the adjustment is made only at the time the type size is determined, and normally would remain the same all during the period a single overlay, as 96, is employed to project a single size of image.

It has been found desirable to provide an accurate indicating means so that uniform variations in spacing can be obtained if desired. This device is illustrated in Figures 3, 5, 8 and 13. It consists essentially of a frame 132 in which a slidable index member 134 is employed. This member is adjustably positioned as by handscrew 135. One or more indices are provided at 136 on a translucent or transparent background so that an image of the index line will appear upon screen 60. Frame 132 is supported and transported by a plurality of substantially vertically disposed rods 138, the lower portions of which are in turn secured to a carriage 140. Carriage 140 provides supporting and guiding means, not only for frame 132 but for the electromagnet 142. Carriage 140 rests upon a rack gear 144 made of magnetic attractable material. This rack gear meshes in the gear shaft 50 so that it moves in step with exterior target 60 and the interior sensitized frame holder 53. It will be noted that a tension spring 143 tends at all times to hold carrier 40 against a suitable stop 146. When, however, electric current flows through conductor 147, then magnet 142 is energized and carrier 140 will move with rack 144 as it is moved longitudinally of its axis. As soon as current is interrupted in conductors 147, then springs 143 take over and return the carrier to its position against stop 146. Current is made or broken by the switching arrangement illustrated in Figure 12, in which it will be apparent that as stop or pawl member 106 is forced to the right, as viewed, by being cammed out of the depression 104, then contact member 148 is moved away from contact 149 and the current is interrupted. It will be restored when pawl member 106 again engages a depression or slot 104, moving contact member 148 to the left, as viewed. To make member 134 most useful, each letter or the like projected by light source 100 is provided with a plurality of vertical indices. The central one, 151, indicates the center of the letter and 152 and 153 may indicate the normal spacing which is often provided for in type by the type shoulders. The spacing between letters may now be varied by moving index line 136 to the right or left of its center or normal position. It is desirable that the projected images of vertical indices as 151 and 152 and 153 be provided as lighted lines on a dark background, so that the image of index 136, projected as a dark line may be superimposed upon the light line as 152, for instance.

It is believed that it will be clearly apparent from the above description and the disclosure in the drawings that the invention comprehends a novel construction of photographic printing apparatus.

Having thus disclosed the invention, I claim:

1. Photographic means for composing type images on a photographically sensitive sheet, comprising: a housing substantially excluding light; first projector means including a source of light positioned to pass a beam of light in said housing; a sensitized sheet positioned within said housing in the path of travel of said beam; character-bearing means interposed between said source of light and said sheet and having a series of portions movable into line with said beam which are capable of passing light in such configurations as to form various type images when projected on said sheet; means for manually adjusting the relative position of said beam and said sheet in a manner so that type images projected on said sheet may be arranged in composed lines; a target sighting board disposed externally of said housing and having a fixed position in relation to said sheet and a second projector disposed externally of said housing and having a fixed position in relation to said first projector means, whereby said sighting board and second projector change relative position in the same manner as said sheet and said first projector means, said second projector including a source of light positioned to throw a target image on said sighting board, thereby providing indicia externally of said housing of the alignment of said first projector means with said sheet; said first projector means including first lens means interposed between said character-bearing means and said sheet and aligned with said beam of light, said first lens means being movable toward and away from said sheet and being operative thereby to change the size of type images projected on said sheet; said second projector including second lens means adjustable to change the size of said target image to correspond to the size of the type images projected on said sheet; said target image being formed by duplicate character-bearing means disposed between said second projector and said sighting board, whereby similar type images may be projected on said sensitized sheet and said sighting board; and said duplicate character-bearing means including with each character a projected scale indicating the center and margins of the character, in which there are secondary adjustment means interposed between said second projector and said sighting board forming an upright line indicia projected by said second projector on said board and indicating in normal position the orientation of a properly projected type image, said secondary adjustment means being connectible to said means for adjusting the position of said sheet whereby adjustment of the position of said upright line indicia for crowding and expanding type is shown visually and automatically shifts said sensitized sheet.

2. The subject matter of claim 1 in which said projected scale and said line indicia are projected one in dark and one in light whereby readings therebetween are facilitated.

3. Photographic means for composing type images on a photographically sensitive sheet, comprising: a housing substantially excluding light; first projector means including a source of light positioned to pass a beam of light in said housing; a sensitized sheet positioned within said housing in the path of travel of said beam; character-bearing means interposed between said source of light and said sheet and having a series of portions movable into line with said beam which are capable of passing light in such configurations as to form various type images when projected on said sheet; means for manually adjusting the relative position of said beam and said sheet in a manner so that type images projected on said sheet may be arranged in composed lines; a target sighting board disposed externally of said housing and having a fixed position in relation to said sheet and a second projector disposed externally of said housing and having a fixed position in relation to said first projector means, whereby said sighting board and second projector change relative position in the same manner as said sheet and said first projector means, said second projector including a source of light positioned to throw a target image on said sighting board, thereby providing indicia externally of said housing of the alignment of said first projector means with said sheet; said first projector means including first lens means interposed between said character-bearing means and said sheet and aligned with said beam of light, said first lens means being movable toward and away from said sheet and being operative thereby to change the size of type images projected on said sheet; said second projector including second lens means adjustable to change the size of said target image to correspond to the size of the type images projected on said sheet; said target image being formed by duplicate character-bearing means disposed between said second projector and said sighting board, whereby similar type images may be projected on said sensitized sheet and said sighting board, in which there are secondary adjustment means interposed between said second projector and said sighting board forming an indicia projected by said second projector on said board and in normal position indicating the orientation of a properly projected type image, said secondary adjustment means being connectible to said means for adjusting the position of said sheet whereby adjustment of the position of said indicia for crowding and expanding type is shown visually and automatically shifts said sensitized sheet.

4. The subject matter of claim 3 in which the means for connecting said secondary adjustment means to said means for adjusting the position of said sheet includes a solenoid making a connection by magnetic attraction, and spring means for returning said indicia to normal position when said solenoid is not activated.

5. The subject matter of claim 4 in which there are switch means for controlling said solenoid and automatically deactivating said solenoid so that said indicia will return to normal position, responsive to change of the image formed by said type-forming means.

6. Photographic means for composing type images on a sensitized sheet, comprising: a housing substantially excluding light; projector means including a source of light positioned to pass a beam of light in said housing; a sensitized sheet positioned in said housing in the path of travel of said beam; character-bearing means interposed between said source of light and said sheet; a pair of guides parallel to said beam and a carriage on said guides and manually operable means for adjusting the position of said carriage on said guides; a frame for supporting said sensitized sheet mounted on said carriage and including means holding said sheet shiftable transversely of said beam, a rack gear connected to said holding means and a shaft supported in said housing and extending parallel to said beam having teeth formed thereon and extending substantially from end to end of said shaft and said rack gear riding on said shaft as it moves toward and away from said projector means with said carriage and a manual control for said shaft, whereby transverse adjustment of said sheet may be effected in any position of said carriage, in which there are second projector means on said housing and a target sighting board external of said housing connected to said sensitized sheet to move therewith and said second projector means casting an image on said target sighting board corresponding to the location of type images cast on said sheet by the first projector means, secondary adjusting means interposed between said second projector means and said target sighting board providing an indicia cast on said target board by said second projector and indicating in normal position an orientation to normal positioning of said image for composing of type at regularly spaced intervals, said secondary adjusting means including a manually movable rack engaged with the teeth on said shaft and means normally holding the means for forming said indicia from indicating the movement of the rack, and means for connecting the indicia forming means to the rack whereby adjustment of the location of said sensitized sheet, transversely of said housing by means of said rack is shown by said indicia shifting on said sighting board responsive to the rack movement.

7. The subject matter of claim 6 in which said means for holding said indicia forming means from following said rack is spring means and in which said means for connecting the indicia forming means to said rack includes a solenoid making the connection by magnetic attraction to said rack.

References Cited in the file of this patent

UNITED STATES PATENTS

| | | |
|---|---|---|
| 1,149,490 | Bagge | Aug. 10, 1915 |
| 1,166,504 | Webster | Jan. 4, 1916 |
| 1,237,239 | Bunnell | Aug. 14, 1917 |
| 1,980,287 | Ogden | Nov. 13, 1934 |
| 2,486,834 | Freund | Nov. 1, 1949 |
| 2,709,952 | Brock | June 7, 1955 |